United States Patent [19]

Nover

[11] Patent Number: 5,530,081
[45] Date of Patent: Jun. 25, 1996

[54] PLASTIC MATERIAL COMPOSED OF SILICON CARBIDE, DIRECTLY-PREPARED POLYCARBOSILANE AND ORGANIC SOLVENT

[75] Inventor: Christoph Nover, Sehnde, Germany

[73] Assignee: Solvay Deutschland GmbH, Hanover, Germany

[21] Appl. No.: 221,001

[22] Filed: Apr. 1, 1994

[30] Foreign Application Priority Data

Apr. 1, 1993 [DE] Germany .............. 43 10 674.9

[51] Int. Cl.⁶ .......... C08G 77/00; C04B 38/00; C04B 35/64; C04B 35/653
[52] U.S. Cl. .............. 528/10; 528/35; 501/80; 501/88; 264/63; 264/65; 264/332
[58] Field of Search .......... 501/80, 88; 264/65, 264/63, 332; 528/10, 35

[56] References Cited

U.S. PATENT DOCUMENTS

| | | | |
|---|---|---|---|
| 4,560,526 | 12/1985 | Okumura | 264/328.2 |
| 4,564,490 | 1/1986 | Omori et al. | 264/65 |
| 5,298,467 | 3/1994 | Hurtado et al. | 501/90 |

FOREIGN PATENT DOCUMENTS

| | | |
|---|---|---|
| 341025 | 11/1989 | European Pat. Off. . |
| 363070 | 4/1990 | European Pat. Off. . |
| 528346 | 2/1993 | European Pat. Off. . |
| 3007384 | 9/1980 | Germany . |
| 3409385 | 9/1984 | Germany . |
| 3500962 | 7/1985 | Germany . |

*Primary Examiner*—John C. Bleutge
*Assistant Examiner*—Karen A. Dean
*Attorney, Agent, or Firm*—Evenson, McKeown, Edwards & Lenahan

[57] ABSTRACT

A plastic material composed of silicon carbide powder, polycarbosilane, organic solvent, and optionally boron compounds and/or other additives, preferably porosity agents; and the use of this plastic composition for producing shaped parts and semi-finished products by plastic shaping.

10 Claims, No Drawings

PLASTIC MATERIAL COMPOSED OF SILICON CARBIDE, DIRECTLY-PREPARED POLYCARBOSILANE AND ORGANIC SOLVENT

BACKGROUND OF THE INVENTION

This invention relates to a plastic material composed of silicon carbide powder and organo-silicon compounds; to the use thereof for producing shaped parts and semi-finished products, and to a process for producing ceramic articles.

It is known to coat shaped bodies with organo-silicon compounds in order to improve the corrosion resistance, heat resistance and oxidation resistance of these shaped bodies by a subsequent heat treatment.

The use of organo-silicon compounds as binders for silicon carbide powders is likewise known. DE-OS 3 007 384 describes the possibility of kneading silicon powder with a sintering aid and an organo-silicon polymer under the action of heat, and shaping this mixture by injection molding, and then baking it to form heat-resistant ceramic articles. In this case, polyborosiloxanes or polycarbosilanes which contain methyl groups and hydrogen as substituents on the silicon of the molecule skeleton are used as the organosilicon polymer.

A mixture of silicon carbide powder, an organo-silicon compound and a lubricant, selected from the group of the higher fatty acids, is known from DE-OS 3 409 385. This mixture can be shaped into moldings and sintered. In this case, the use of the lubricant is essential in order to impart to the mixture good flowability and improved mold-separation ability, because it is likewise known that mixtures of silicon carbide powder and an organo-silicon compound have low flowability. This means that such mixtures cannot be plastically deformed or the mixture remains adhering to the molds, even if the molds are coated with parting agents, so the molded articles are very often faulty. For this reason, mass production of molded products is difficult or impossible.

A further disadvantage of the known solutions is the low ceramic yield, since during the ceramic treatment e.g. the lubricant has to be burned out, which necessarily results in an increase in porosity.

SUMMARY OF THE INVENTION

It is the object of the invention to provide an improved ceramisizable plastic composition.

A further object of the invention is to provide a plastic composition which can be formed into the desired shape by plastic shaping and can then be ceramicized.

Another object of the invention is to provide a ceramisizable plastic composition which can be used directly due to its plastic properties.

An additional object of the invention is to provide a moldable and ceramisizable plastic composition which achieves a high ceramic yield upon ceramicization of the molded articles.

Yet another object of the invention is to provide a method of forming ceramisizable shaped articles.

A still further object of the invention is to provide a method of producing a ceramic-ceramic composite.

These and other objects of the invention are achieved by providing a plastic composition comprising 50 to 95 parts by weight silicon carbide powder, 50 to 5 parts by weight directly-prepared polycarbosilane containing phenyl groups, and 6 to 30 parts by weight organic solvent in which said polycarbosilane is soluble or swellable.

In accordance with a further preferred aspect of the invention, the plastic composition further comprises from 0.1 to 3 parts by weight boron compound.

In accordance with a further aspect of the invention, the objects are also achieved by providing a method of producing a shaped article comprising providing a plastic composition comprising 50 to 95 parts by weight silicon carbide powder, 50 to 5 parts by weight directly-prepared polycarbosilane containing phenyl groups, and 6 to 30 parts by weight organic solvent in which said polycarbosilane is soluble or swellable; and forming said plastic composition into a shape corresponding to said shaped article. The shaped article may be ceramicized by subsequent heat treatment.

In accordance with yet another preferred aspect of the invention, the objects are additionally achieved by providing a method for producing a ceramic-ceramic composite comprising first and second ceramic parts, wherein the method comprises forming an assembly comprising said first and second ceramic parts with a plastic composition comprising 50 to 95 parts by weight silicon carbide powder, 50 to 5 parts by weight directly-prepared polycarbosilane containing phenyl groups, and 6 to 30 parts by weight organic solvent in which said polycarbosilane is soluble or swellable interposed therebetween; and heat treating the assembly to ceramicize the plastic composition and bond the first and second ceramic parts to each other.

DETAILED DESCRIPTION OF PREFERRED EMBODIMENTS

According to the invention, the plastic material is characterized by a mixture of 50 to 95 parts by weight silicon carbide powder, 5 to 50 parts by weight directly-prepared polycarbosilanes containing phenyl groups, optionally 0.1 to 3 parts by weight of a boron compound, and 6 to 30 parts by weight organic solvent, in which the polycarbosilane is soluble or swellable.

Advantageously, polycarbosilanes corresponding to the general formula I,

in which $R^1$ stands for aryl, preferably phenyl, $R^2$ stands for H, alkyl, cycloalkyl, aryl or arylalkyl, $R^2$ also being able to have different meanings in different units of one and the same polycarbosilane, and A stands for a straight-chain or branched alkylene radical or for a cycloalkylene radical, A also being able to have different meanings in different units of one and the same polycarbosilane, and up to a maximum of 50% of the structural units of the general formula I being able to be replaced by structural units of the general formula II,

wherein $R^{1'}$ and $R^{2'}$ stand for alkyl, cycloalkyl or arylalkyl, and $R^{1'}$ and $R^{2'}$ may also have different meanings in different units of one and the same polycarbosilane, and A stands for a straight-chain or branched alkylene radical or for a cycloalkylene radical, A also being able to have different meanings in different units of one and the same polycarbosilane, are used as polycarbosilanes.

Such polycarbosilanes are produced by reacting the corresponding dihalosilanes with corresponding dihalohydrocarbons in the presence of alkali metal or magnesium.

Polycarbosilanes which have hetero elements, preferably boron or titanium, incorporated in the polycarbosilane structure may also be used. The hetero elements in this case, just like the silicon atoms, are linked to the other units of the polycarbosilane via alkylene, cycloalkylene or arylene radicals. Such polycarbosilanes which contain hetero atoms are produced by co-condensation of a dihalohetero atom, preferably with boron or titanium as hetero atom, with at least one dihalosilane and at least one dihalohydrocarbon in the presence of alkali metal or magnesium.

If polycarbosilanes containing such hetero atoms are used as constituents of the mixture, the addition of a boron compound can be omitted.

Preferably boron carbide, boron or borides are used as boron compounds.

As used herein the term "swellable polycarbosilanes" refers to polycarbosilanes which correspond to the general formula I or I and II and which have been deliberately cross-linked by heat treatment.

According to the invention, the plastic material contains organic solvent from the group consisting of alkanes, chloroalkanes, aromatics, ethers, polyethers or polyglycols. Preferably, xylene, triethylene glycol dimethyl ether or polyethylene glycol are used, or solvents which have a boiling point of more than 100° C.

The suitable proportion of the solvent can lie within the range of 6 to 30 parts by weight, relative to the weight of the total mass of the plastic material, with the amount depending on the desired used of the plastic material.

Optionally, also additional auxiliary additives, preferably those which increase the porosity of the ceramic parts, may be added to the plastic material according to the invention.

To produce the mixture, first of all the polycarbosilanes may be dissolved or swollen in the solvent and then be kneaded with the silicon carbide powder and the other constituents, or the mixture constituents are simultaneously brought into contact with each other.

In order to swell a polycarbosilane, the solvent is mixed with the polycarbosilane and the mixture is allowed to stand for approximately 2 hours. Then they are homogenized in an Ultraturrax mixer and then brought into contact with the other mixture constituents.

After thorough mixing or kneading of the mixture, the excess solvent can be evaporated off up to a desired extent.

The resulting plastic material can then be formed to the desired shape, e.g. by plastic shaping such as molding, extrusion forming or injection molding, and then ceramicized under conventional ceramicization conditions. Due to the nature of the mixture constituents, the ceramic yield is high, and it is possible to obtain dense molded articles by sintering.

The ceramicization usually takes place at temperatures above 1,000° C., and the sintering into dense molded articles at temperatures above 2,000° C.

With the material according to the invention, it is also possible to produce porous ceramic molded articles. In this case, a so-called porosity agent is added to the plastic material as a mixture constituent, in a quantity which corresponds to the desired porosity of the ceramicized molded articles. Examples of suitable porosity agents include starch, wood flour and carbon or coal. The ceramicization and optionally sintering take place under the above known conditions.

The resulting porous molded articles are distinguished by high strength as a result of their highly dense matrix surrounding the pores.

It is likewise possible to use the plastic material to produce ceramic-ceramic composites, in that the parts to be joined are fitted together with the plastic material and are then burned at T>900° C. Likewise, it is possible to use the plastic material directly owing to its good plastic deformability, without subsequent heat treatment having to take place.

Because of its properties, the material according to the invention can be used both for the mass production of molded articles or semi-finished products of widely-varying shapes and for the production of complicated shapes. The possibility of adapting the viscosity of the material or its flow behavior to the desired shaping process in each case by varying the content of solvent is a further advantage of the material according to the invention.

The following examples are intended to illustrate the invention in further detail without limiting its scope.

Various shapes were produced from the material according to the invention by extrusion. An extruder of known construction was used. Pressures of at least 10 to 70 MPa were required at the mouth of the extruder. The application of higher pressures increases the transport rate.

The production of very thin strands, e.g. strands having a diameter of 0.2 mm, requires the use of substances richer in solvent than the production of voluminous strands, e.g. tubes, which is possible only with the use of compositions with lower solvent contents.

The following strand forms were produced:

A cylindrical, diameter 0.2 mm

B cylindrical, diameter 0.5 mm

C cylindrical, diameter 3.0 mm

D tube, external diameter 35 mm, internal diameter 15 mm,

TABLE 1

| Composition of the mixtures in % by weight | | | | |
|---|---|---|---|---|
| | Mixture | | | |
| | 1 | 2 | 3 | 4 |
| Polydiphenylcarbosilane (D-PPC) | 17.0 | 17.0 | 18.0 | 18.0 |
| SiC powder (Lonza UF15) | 67.4 | 67.4 | 71.4 | 71.4 |
| Boron carbide | 0.6 | 0.6 | 0.6 | 0.6 |
| Xylene | 15.0 | — | 10.0 | — |
| Triethylene glycol dimethyl ether | — | 15.0 | — | 10.0 |

TABLE 2

| Mixture | Extrusions performed | | | | | | | | | | |
|---|---|---|---|---|---|---|---|---|---|---|---|
|  | 1 | 2 | 1 | 2 | 3 | 4 | 1 | 2 | 3 | 4 | 3 | 4 | 5 |
| Strand form | A | A | B | B | B | B | C | C | C | C | D | D |

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a shaped article comprising the steps of:

providing a plastic composition comprising 50 to 95 parts by weight silicon carbide powder, 50 to 5 parts by weight directly-prepared polycarbosilane containing phenyl groups, and 6 to 30 parts by weight organic solvent in which said polycarbosilane is soluble or swellable; and casting, injection molding or extruding said plastic composition into a shape corresponding to said shaped article, and heat treating said shaped article to form a ceramicized shaped article.

2. A method according to claim 1, wherein said heat treatment is carried out at a temperature above 1000° C.

3. A method according to claim 1, wherein said plastic composition further comprises from 0.1 to 3 parts by weight boron compound.

4. A method according to claim 1, wherein said organic solvent is selected from the group consisting of alkanes, chloroalkanes, aromatics, ethers, polyethers, polyglycols and mixtures thereof.

5. A method according to claim 4, wherein said organic solvent comprises xylene, triethylene glycol dimethyl ether or polyethylene glycol.

6. A method for producing a ceramic-ceramic composite comprising first and second ceramic parts; said method comprising the steps of:

forming an assembly comprising said first and second ceramic parts with a plastic composition comprising 50 to 95 parts by weight silicon carbide powder, 50 to 5 parts by weight directly-prepared polycarbosilane containing phenyl groups, and 6 to 30 parts by weight organic solvent in which said polycarbosilane is soluble or swellable interposed therebetween; and heat treating said assembly to ceramicize said plastic composition and bond said first and second ceramic parts to each other.

7. A method according to claim 6, wherein said plastic composition further comprises from 0.1 to 3 parts by weight boron compound.

8. A method according to claim 6, wherein said organic solvent is selected from the group consisting of alkanes, chloroalkanes, aromatics, ethers, polyethers, polyglycols and mixtures thereof.

9. A method according to claim 8, wherein said organic solvent comprises xylene, triethylene glycol dimethyl ether or polyethylene glycol.

10. A method according to claim 6, wherein said plastic composition further comprises a porosity increasing additive selected from the group consisting of starch, wood flour and coal.

* * * * *